United States Patent
Oliveirinha et al.

(10) Patent No.: US 11,645,114 B2
(45) Date of Patent: *May 9, 2023

(54) DISTRIBUTED STREAMING SYSTEM SUPPORTING REAL-TIME SLIDING WINDOWS

(71) Applicant: Feedzai—Consultadoria e Inovação Tecnológica, S.A., Coimbra (PT)

(72) Inventors: João Miguel Forte Oliveirinha, Loures (PT); Ana Sofia Leal Gomes, Lisbon (PT); Pedro Cardoso Lessa e Silva, Oporto (PT); Pedro Gustavo Santos Rodrigues Bizarro, Lisbon (PT)

(73) Assignee: Feedzai—Consultadoria e Inovação Tecnológica, S.A.

( * ) Notice: Subject to any disclaimer, the term of this patent is extended or adjusted under 35 U.S.C. 154(b) by 0 days.

This patent is subject to a terminal disclaimer.

(21) Appl. No.: 17/575,477

(22) Filed: Jan. 13, 2022

(65) Prior Publication Data

US 2022/0138006 A1    May 5, 2022

Related U.S. Application Data

(63) Continuation of application No. 17/356,310, filed on Jun. 23, 2021, now Pat. No. 11,269,684.

(30) Foreign Application Priority Data

May 19, 2021  (EP) ..................................... 21174843
May 19, 2021  (PT) ......................................... 117243

(51) Int. Cl.
*G06F 9/48*    (2006.01)
*G06F 16/21*   (2019.01)
(Continued)

(52) U.S. Cl.
CPC ............ *G06F 9/4887* (2013.01); *G06F 9/505* (2013.01); *G06F 9/5038* (2013.01); *G06F 9/542* (2013.01);
(Continued)

(58) Field of Classification Search
None
See application file for complete search history.

(56) References Cited

U.S. PATENT DOCUMENTS

| | | | |
|---|---|---|---|
| 2015/0205647 A1* | 7/2015 | Gupta .................... | G06F 11/008 719/318 |
| 2015/0248462 A1* | 9/2015 | Theeten ............ | G06F 16/24524 707/688 |
| 2020/0193239 A1* | 6/2020 | Wilson .................... | G06F 18/24 |

OTHER PUBLICATIONS

Abadi et al., Aurora: A Data Stream Management System, SIGMOD 2003, Jun. 9-12, 2003.
(Continued)

*Primary Examiner* — Craig C Dorais
(74) *Attorney, Agent, or Firm* — Van Pelt, Yi & James LLP

(57) ABSTRACT

In various embodiments, a process for providing a distributed streaming system supporting real-time sliding windows includes receiving a stream of events at a plurality of distributed nodes and routing the events into topic groupings. The process includes using one or more events in at least one of the topic groupings to determine one or more metrics of events with at least one window and an event reservoir including by: tracking, in a volatile memory of the event reservoir, beginning and ending events within the at least one window; and tracking, in a persistent storage of the event reservoir, events associated with tasks assigned to a respective node. The process includes updating the one or more metrics based on one or more previous values of the
(Continued)

one or more metrics as a new event is added or an existing event is expired from the at least one window.

20 Claims, 9 Drawing Sheets

Related U.S. Application Data

(60) Provisional application No. 63/066,035, filed on Aug. 14, 2020.

(51) Int. Cl.
    *G06F 9/50*     (2006.01)
    *G06F 9/54*     (2006.01)
    *G06F 11/30*    (2006.01)

(52) U.S. Cl.
    CPC ........ *G06F 11/3072* (2013.01); *G06F 16/211* (2019.01); *G06F 2201/835* (2013.01); *G06F 2201/86* (2013.01)

(56) References Cited

OTHER PUBLICATIONS

Abadi et al., The Design of the Borealis Stream Processing Engine, Proceedings of the 2005 CIDR Conference, 2005.
Akidau et al., MillWheel: Fault-Tolerant Stream Processing at Internet Scale, Proc. VLDB Endow., 6(11):1033-1044, Aug. 2013.
Akidau et al., The Dataflow Model: A Practical Approach To Balancing Correctness, Latency, and Cost In Massive-Scale, Unbounded, Out-Of-Order Data Processing. Proc. VLDB Endow., 8(12):1792-1803, Aug. 2015.
Alexander Fedulov, Apache Flink: Advanced Flink Application Patterns vol. 3: Custom Window Processing, Jul. 30, 2020.
Alibaba, Alibaba Cloud Supported 583,000 Order/Second for 2020 Double 11—The Highest Traffic Peak in the World! Alibaba Clouder, Nov. 12, 2020.
Andrey Zagrebin, Memory Management Improvements with Apache Flink 1.10, Apr. 21, 2020.
Apache Commons, Apache Commons JEXL, Java Expression Language (JEXL) Apr. 14, 2017.
Arasu et al., STREAM: The Stanford Stream Data Manager (Demonstration Proposal), 2003.
Armbrust et al., Structured Streaming: A Declarative API For Real-Time Applications In Apache Spark, In SIGMOD, 2018.
Author Unknown, Akka Documentation (../index.html) Version 2.6.14, Apr. 2021.
Benjamin Van Roy, A Short Proof of Optimality for the MIN Cache Replacement Algorithm, Dec. 2, 2010, pp. 1-3.
Benson et al., Disco: Efficient Distributed Window Aggregation, Proceedings of the 23rd International Conference on Extending Database Technology (EDBT), Mar. 30-Apr. 2, 2020.
Branco et al., Interleaved Sequence RNNs for Fraud Detection, Applied Data Science Track Paper, KDD '20, Aug. 23-27, 2020.
Carbone et al., Apache Flink TM: Stream and Batch Processing in a Single Engine, 2015.
Carbone et al., Cutty: Aggregate Sharing for User-Defined Windows, CIKM' 16, Oct. 24-28, 2016.
Chaitanya Swamy et al., Reducibility Among Combinatorial Problems—Richard Karp, Jan. 1972.
Chandramouli et al., Quill: Efficient, Transferable, and Rich Analytics at Scale, Proceedings of the VLDB Endowment, vol. 9, No. 14, 2016.
Chandramouli et al., Trill: Engineering a Library for Diverse Analytics, 2015.
Chandrasekaran et al., TelegraphCQ: Continuous Dataflow Processing for an Uncertain World, Proceedings of the 2003 CIDR Conference.
Chen et al., NiagaraCQ: A Scalable Continuous Query System for Internet Databases, Jun. 2000.
Chen et al., Realtime Data Processing At Facebook. SIGMOD, 2016.
Dean et al., Contributed Articles, Software Techniques that Tolerate Latency Variability are Vital to Building Responsive Large-Scale Web Services, The Tail at Scale, Communications of the ACM, Feb. 2013, vol. 56, No. 2, pp. 74-80.
Gedik et al., SPADE: The System S Declarative Stream Processing Engine, SIGMOD'08, Jun. 9-12, 2008.
Gencer et al., Hazelcast Jet: Low-Latency Stream Processing at the 99.99th Percentile, Mar. 18, 2021.
Github, Facebook,/Rocksdb, Welcome to RocksDB, Apr. 10, 2021.
Guo Jia et al., "Smart Streaming: A High-Throughput Fault-tolerant Online Processing System", 2020 IEEE International Parallel and Distributed Processing Symposium Workshops, May 18, 2020, pp. 396-405.
highscalability.com, Your Load Generator is Probably Lying to You—Take the Red Pill and Find out Why, Oct. 5, 2015.
Isah Haruna et al., "A Survey of Distributed Data Stream Processing Frameworks", IEEE Access, vol. 7, Nov. 4, 2019, pp. 154300-154316.
Jay Kreps, Confluent, Stream Processing, Introducing Kafka Streams: Stream Processing Made Simple, Mar. 10, 2016.
John Rose, CompressedOops, May 3, 2012.
Karthik Ramasamy, Keynote: Unifying Messaging, Queuing, Streaming and Light Weight Compute for Online Event Processing, DEBS'19, Jun. 24-28, 2019.
Kiran et al., Lambda Architecture for Cost-Effective Batch and Speed Big Data Processing, 2015 IEEE International Conference on Big Data (Big Data), Dec. 22, 2015.
Kreps et al., Kafka: A Distributed Messaging System for Log Processing, NetDB'11, Jun. 12, 2011.
Kulkarni et al., Twitter Heron: Stream Processing at Scale, SIGMOD'15, May 31-Jun. 4, 2015.
Marios Fragkoulis et al., "A Survey on the Evolution of Stream Processing Systems", Cornell University Library, Aug. 3, 2020.
Mendes et al., Overcoming Memory Limitations in High-Throughput Event-Based Applications, ICPE'13, Apr. 21-24, 2013.
Noghabi et al., Samza: Stateful Scalable Stream Processing At Linkedin, Proc. VLDB Endow., 10(12):1634-1645, Aug. 2017.
O'Neil et al., The Log-Structured Merge-Tree (LSM-Tree). Acta Informatica, 33(4):351-385, 1996.
Rabbitmq, Quorum Queues, A Webinar on High Availability and Data Safety in Messaging, Mar. 21, 2021.
Shi et al., Deca: A Garbage Collection Optimzer for In-Memory Data Processing, ACM Transactions on Computer Systems, vol. 36, No. 1, Article 3, Mar. 2019.
Suhothayan et al., Siddhi: A Second Look at Complex Event Processing Architectures, GCE'11, Nov. 18, 2011.
Theodorakis et al., LightSaber: Efficient Window Aggregation on Multi-Core Processors, SIGMOD'20, Jun. 14-19, 2020.
Toshniwal et al., Storm @Twitter, SIGMOD'14, Jun. 22-27, 2014.
Traub et al., Scotty: Efficient Window Aggregation for Out-of-Order Stream Processing, Apr. 2018.
Tucker et al., Exploiting Punctuation Semantics in Continuous Data Streams, IEE Transactions on Knowledge and Data Engineering, vol. 15, No. 3, May/Jun. 2003.
Xin et al., Project Tungsten: Bringing Apache Spark Closer to Bare Metal, Databricks, Apr. 28, 2015.

\* cited by examiner

500

DISTRIBUTED STREAMING SYSTEM SUPPORTING REAL-TIME SLIDING WINDOWS

CROSS REFERENCE TO OTHER APPLICATIONS

This application is a continuation of U.S. patent application Ser. No. 17/356,310 entitled DISTRIBUTED STREAMING SYSTEM SUPPORTING REAL-TIME SLIDING WINDOWS filed Jun. 23, 2021 which is incorporated herein by reference for all purposes, which claims priority to U.S. Provisional Patent Application No. 63/066,035 entitled STREAMING WINDOWS FOR MISSION CRITICAL SYSTEMS filed Aug. 14, 2020, which is incorporated herein by reference for all purposes.

U.S. patent application Ser. No. 17/356,310 claims priority to Portugal Provisional Patent Application No. 117243 entitled DISTRIBUTED STREAMING SYSTEM SUPPORTING REAL-TIME SLIDING WINDOWS filed May 19, 2021, which is incorporated herein by reference for all purposes.

U.S. patent application Ser. No. 17/356,310 claims priority to European Patent Application No. 21174843.9 entitled DISTRIBUTED STREAMING SYSTEM SUPPORTING REAL-TIME SLIDING WINDOWS filed May 19, 2021, which is incorporated herein by reference for all purposes.

BACKGROUND OF THE INVENTION

Sensitive data is increasingly being transmitted over the Internet for example by point of sale systems at physical store locations, automated teller machines at bank branches as well as transactions associated with online shops and banks. Electronic security measures such as fraud detection systems analyze transactional data to detect a security breach. A good fraud detection system is expected to provide accurate, real-time metrics over long sliding windows on applications and be capable of handling high throughputs and provide low latencies. These applications are expected to run continuously and be able to cope with large and spiky data loads. However, conventional systems typically are unable to provide these properties.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conventional streaming engines typically do not simultaneously (i) provide accurate sliding window aggregations per event, (ii) scale beyond a single node, and (iii) comply with millisecond-level latencies. In low throughputs and small windows, events can fit in-memory of a single node, and accurate aggregations can be computed for every new event over sliding windows. However, this is challenging for large windows or high throughputs.

Figure 1:
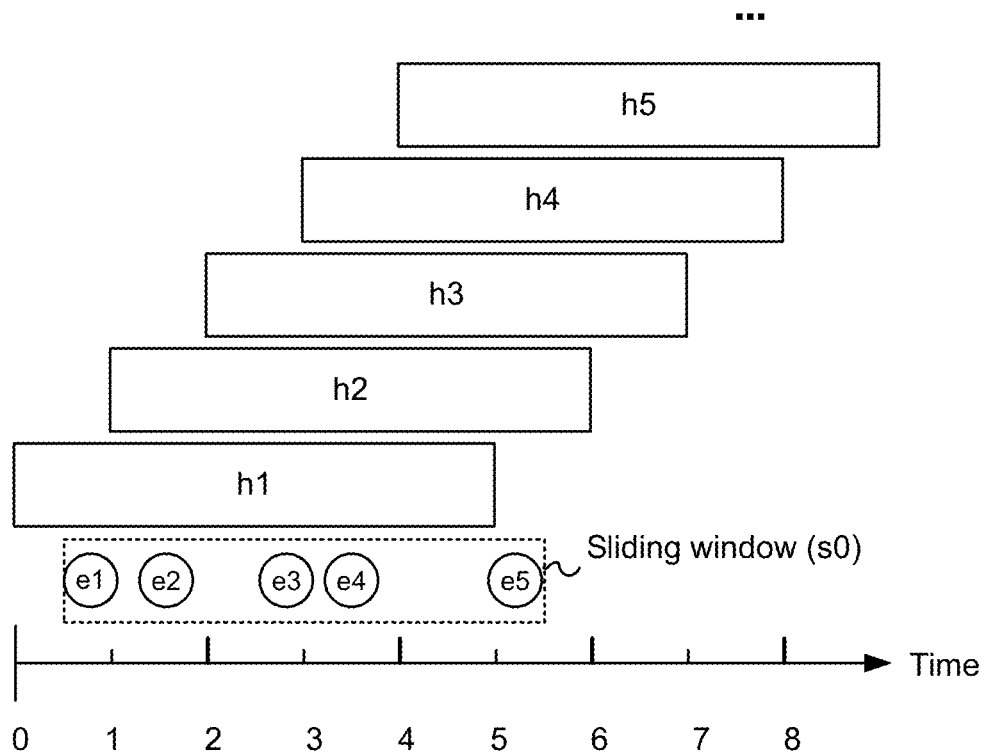
FIG. 1 shows an example of a stream of events that can be processed using a distributed streaming system supporting real-time sliding windows according to embodiments of the present disclosure.

To keep latency low while handling high event throughputs, some conventional techniques either shed load (i.e., throw away some information on purpose to reduce load, but causing a reduction in accuracy) or use hopping windows as an approximation of real-time sliding windows in an attempt to save memory. For example, a 5-min sliding window can be mimicked by using five fixed physical 5-min windows, each offset by 1 minute (the hop), an example of which is shown in FIG. 1. As time passes, new windows and their aggregations are created and expired. However, this might lead to inaccurate aggregations because sometimes a hopping window does not precisely approximate a real-time sliding window, leading to inaccurate aggregation results. For example, where a true 5-min sliding window takes into account all 5 events for its aggregations when a new event arrives, but a hopping window with 1-minute hop does not because the oldest hopping window has already expired so it does not capture all 5 events together (see FIG. 1).

Configuring hops to be smaller is computationally expensive because the process then needs to concurrently manage many more windows, e.g., 300 5-min physical windows with a hop of 1 second, instead of five 5-min physical windows with a hop of 1 minute. In addition, since the frequency on which time slides is still fixed, a 1-second hop window might still not capture all events together.

Techniques for providing distributed streaming systems supporting real-time sliding windows are disclosed. The distributed streaming system has a low-memory-footprint, implements disk-backed sliding windows, and includes a state-management and distributed communication layers. The distributed streaming system has several characteristics including:

Being able to meet millisecond-level latencies at high percentiles (e.g., <250 ms @ 99.9%), Having accurate sliding window aggregations event-by-event, and Being distributed, scalable, and fault-tolerant.

The system finds application in a variety of scenarios including those requiring high loads and millisecond-level latencies. The system scales well (nearly linearly in some experiments), which enables it to meet service level agreements. In some experiments, the system meets millisecond-level latencies at high percentiles (<250 ms @ 99.9%) even under a load of 1 million events per second. An example of the system is Railgun by Feedzai®.

FIG. 1 shows an example of a stream of events that can be processed using a distributed streaming system supporting real-time sliding windows according to embodiments of the present disclosure. In this example, a data stream S includes an unbounded sequence of events. Here, five of the events in the data stream (e1, e2, e3, e4, e5) are show, and each data point has a timestamp. Aggregations over streams are computed using windows. A window w is a sequence of contiguous data over S with a certain size ws. The size can be defined by a number of events, time interval, start-stop conditions as in a user session, among other things. As time passes, a window over a stream is evaluated, at a specific, and changing, timepoint Teval. Teval determines the events to include for the aggregations, where an event with timestamp ti belongs to a window evaluation if and only if Teval−ws≤ti<Teval.

Hopping windows are windows where Teval changes according to a step of length s. This step s, or hop, marks when new windows are created. If s is smaller than ws, then the windows overlap, i.e., an event may belong to more than one hopping window. When s is equal to ws, hopping windows do not overlap, and events belong to exactly one window. This special case is called "tumbling windows". Step s is generally not bigger than ws. In this example, hopping windows h1-h5 is each a 5-minute hopping window with a 1-minute hop.

Real-time sliding windows (sometimes simply "sliding windows"), are windows where Teval is the moment right after a new event has arrived. Although aggregations over sliding windows tend to be accurate, frequent evaluation tends to be computationally expensive as, for each new event ei, the system expires events and (re)computes aggregations. In this example, sliding window s0 is a 5-minute sliding window that moves when a new event is received.

What gets calculated at Teval is one or more metrics associated with the data stream. For example, a fraud detection system uses a combination of machine learning models and rule based-systems, both fueled by streaming aggregations. For instance, queries such as Q1 and Q2 below can be used to profile the common behaviors of card holders or merchants, and detect suspicious behavior. Example 1:

Q1: SELECT SUM (amount), COUNT (*) FROM payments
GROUP BY card [RANGE 5 MINUTES]
Q2: SELECT AVG (amount) FROM payments
GROUP BY merchant [RANGE 5 MINUTES]

Profiles computed over hopping windows are weaker as they are vulnerable to adversary attacks. Sophisticated fraudsters use many techniques to understand the best possible timings, and exploit attacks to occur at specific times, or follow a specific cadence, taking advantage of the predictable hop size.

Achieving 100% compliance over long windows is a common requirement of anti-money laundering regulations, which includes rules such as: "if the ratio between the money in and out of an account is higher than 90% in the last 30-days, immediately suspend the account and flag it for investigation". Failing to ensure precision over these rules, may cause penalties, heavy sanctions, and reputational damage.

When streaming aggregations are limited to hopping windows, to achieve compliance and have metrics over long windows, conventional fraud detection systems typically use batch jobs and lambda-architectures. However, in these systems, compliance is typically not achieved in real-time, limiting the possibility of actively preventing fraud from happening, and being restrictive to use-cases where a post-mortem alarm is useful. Real-time 100% compliance (i.e., accurate metrics per-event, A) is only possible using real-time sliding windows.

Figure 2:
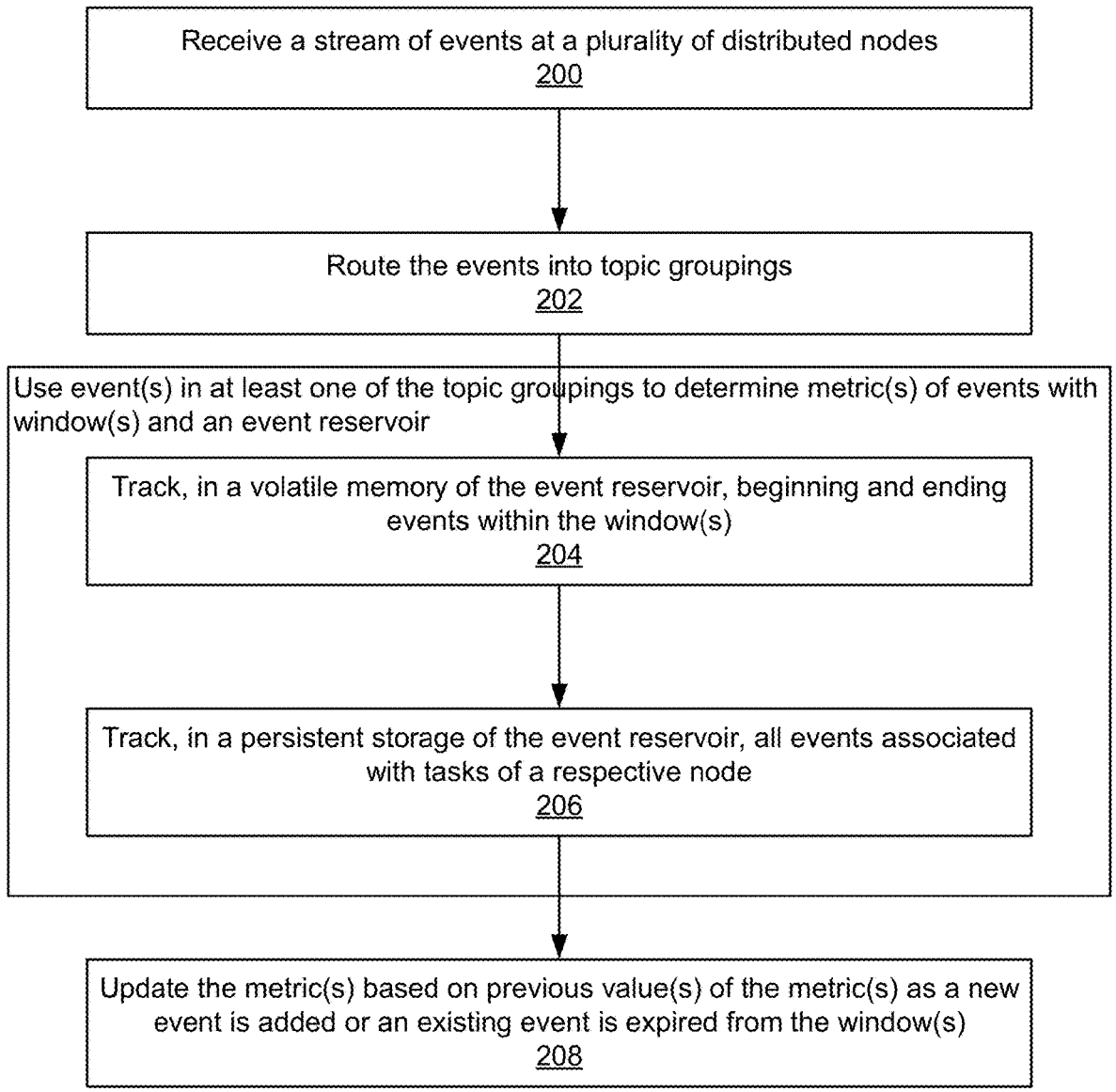
FIG. 2 is a flow diagram illustrating an embodiment of a process for providing a distributed streaming system supporting real-time sliding windows.

FIG. 2 is a flow diagram illustrating an embodiment of a process for providing a distributed streaming system supporting real-time sliding windows. In various embodiments, the process is performed by a system such as the one shown in FIG. 3.

In the example shown, the process begins by receiving a stream of events at a plurality of distributed nodes (200). A node refers to a computing unit (implemented by one or more hardware processors) belonging to a group of nodes called a cluster. The nodes may be distributed meaning they are not necessarily co-located. Nodes of a cluster may cooperate to perform one or more computing tasks. Referring briefly to FIG. 1, a stream of events (e1 . . . e5) is received by a plurality of distributed nodes. The events may capture various data, for example events are transactions in the context of fraud detection. The stream of events may be sent by clients to fraud detection or anti-money laundering systems system such as Feedzai Pulse®. As further described herein, a node may consume the event(s), by processing the event and storing information in an event reservoir and a metric state store.

The process routes the events into topic groupings (202). The topic groupings are also referred to as "partitioners". The events are forwarded into one or more event topics, where the topics are managed by a messaging system such as Apache Kafka® (sometimes simply referred to as "Kafka®"). In other words, the events may be categorized or otherwise sorted into different topic groupings. Any number of topic groupings may be used. Using the example of fraud detection, one topic is "merchant", another is "card", etc.

The received events are routed into one or more appropriate topic groupings. For example, a transaction with merchant information would be routed into the merchant topic grouping. An example process for partitioning a stream into topics and further splitting topics into (topic, partition) is further described with respect to FIG. 8. By processing events this way to obtain a (topic, partition), work is broken down into a unit of work that can be assigned to a task processor. In various embodiments, the assignment of tasks to nodes may be rebalanced periodically or on demand as further described with respect to FIG. 7.

The process uses one or more events in at least one of the topic groupings to determine one or more metrics of events with a at least one window including by: tracking, in a volatile memory of the event reservoir, beginning and ending events within the at least one window (204) and tracking, in a persistent storage of the event reservoir, all events associated with tasks of a respective node (206). The process polls events from partition assignments and calculates metrics (e.g., aggregations). A (topic, partition) combination corresponds to a task, which has an associated task plan defining how aggregation metrics are calculated for a data stream subset, as further described herein. Aggregation metrics may be calculated by: tracking, in a memory buffer (such as an event reservoir further described herein, e.g., with respect to FIG. 5), beginning and ending events within a window and updating the metrics based on one or more previous values of the one or more metrics as a new event is added or an existing event is expired from the window. The window can be a time window or one whose size is based on the number of events. The window can be real-time sliding windows or delayed windows (real-time windows offset by some amount of time). In various embodiments, other types of windows such as tumbling windows or infinite windows are supported. For a real-time sliding window, after steps 204 and 206, the process moves the at least one window as the new event is added or the existing event is expired in various embodiments.

The process updates the one or more metrics based on one or more previous values of the one or more metrics as a new event is added or an existing event is expired from the at least one window (208). The process can determine one or more metrics for multiple windows. A process for determining one or more metrics of events is further described with respect to FIG. 4.

In the context of fraud detection, a metric can be a profile, which profiles the transaction history of physical entities such as card holders or merchants or terminals, or non-physical entities such as emails, IP addresses, zip codes, merchant category codes, product codes, and others. In various embodiments, a profile includes arithmetic aggregation of data. Examples include: a count of distinct number of emails in the last 6 months; an average expenditure of a user per transaction in the last week; or the like. The metrics of events can be used to make a fraud detection decision or recommendation.

The process will now be explained in the context of a system for supporting real-time sliding windows.

Figure 3:
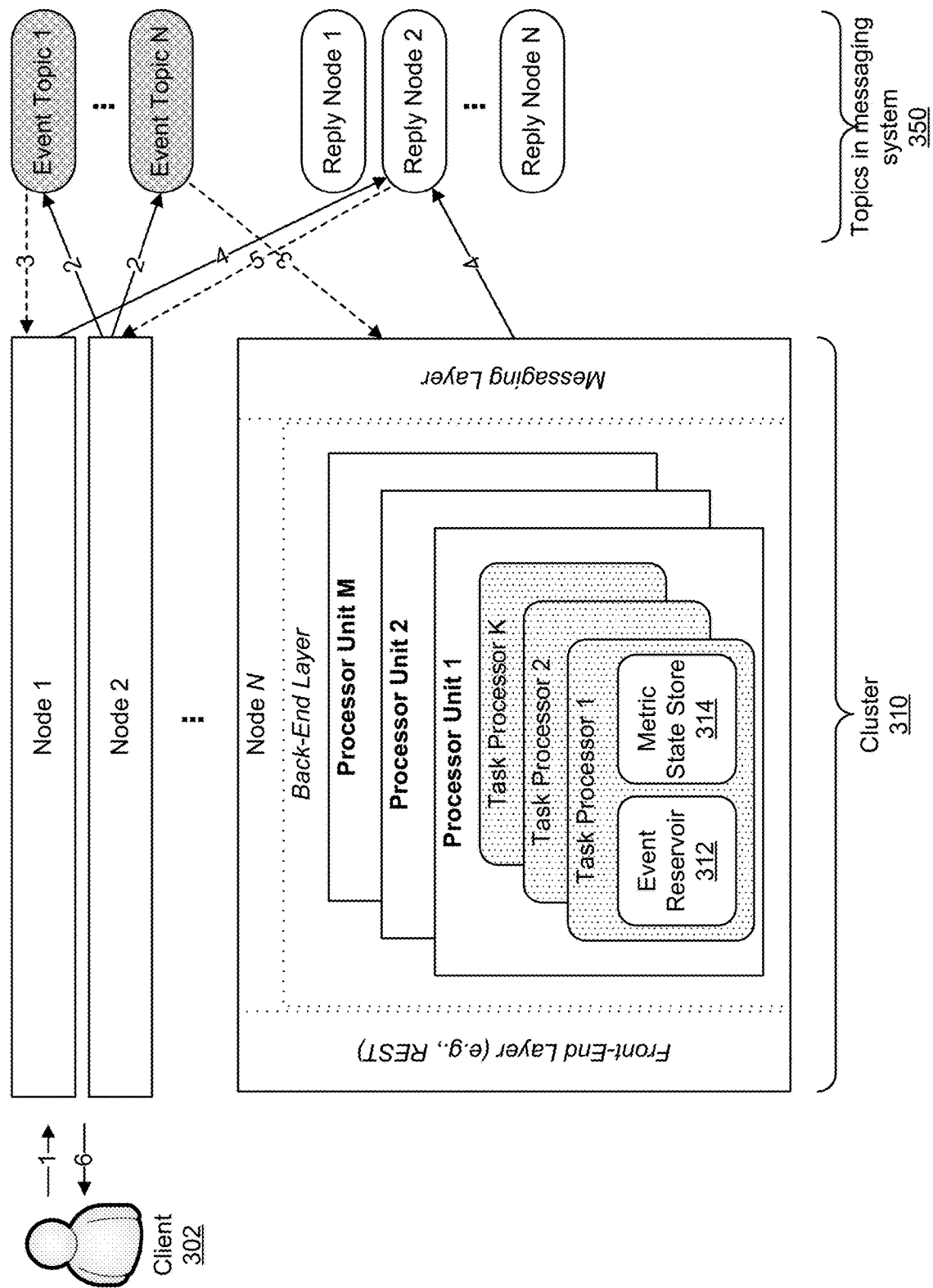
FIG. 3 is a block diagram illustrating an embodiment of a distributed streaming system supporting real-time sliding windows.

FIG. 3 is a block diagram illustrating an embodiment of a distributed streaming system supporting real-time sliding windows. Conventional stream processing engines that support the use case of continuous queries typically run as a single-node and are not low latency for large windows. Some stream processing engines are being developed that focus on processing high throughputs under low latency requirements (e.g., on the order of <250 ms @ 99.9% accuracy), by building scalable, fault-tolerant, distributed systems. However, to achieve such high level of performance, these systems need to limit what windows are possible. By contrast, the disclosed distributed streaming engine has low latency and implements real-time sliding windows, not restricting the window slide movement to fixed hops.

The disclosed streaming engine has many advantages compared with conventional systems. In one aspect, the disclosed streaming engine supports real-time sliding windows to achieve aggregation correctness at all times (and not just at every hop). In another aspect, the disclosed streaming engine uses an event reservoir to efficiently store and access events under low latency and optimal memory usage. In yet another aspect, the disclosed streaming engine manages an embedded metric state store (persisted in a key-value store, RocksDB for example) for holding aggregation states and auxiliary data. In yet another aspect, the disclosed streaming engine takes advantage of a messaging layer (e.g., using Kafka) for distributed processing, fault-tolerance and recovery. The disclosed system delivers event-by-event accurate results, by supporting real-time sliding windows, while still providing millisecond-level latencies at high percentiles and horizontal scaling properties. The system can preserve these consistent tail latency (i.e., for high percentile-latency values) results even when it is scaled to achieve throughputs of one million events per second, and its performance is independent of the window size.

The system includes one or more nodes (here, Node 1 through Node N), collectively referred to as cluster 310. Each of the nodes may include the components described with respect to Node N. Node N includes a front-end layer, a back-end layer, and a messaging layer. The front-end layer communicates with the client, the back-end layer computes aggregations and accesses storage, and the messaging layer handles distribution of tasks, detects failures, and manages communications between processor unit workers. The examples herein describe a node that is not split by function, but this is not intended to be limiting and it is possible to have different nodes split by function.

The front-end layer is configured to communicate with client 302 such as receiving client requests, including events, requests for new metrics/streams, or deletions. The front-end layer is configured to distribute events and manage the overall cluster state in cooperation with the messaging layer. The front-end layer may use various protocols to manage client communications, one example of which is REST.

The back-end layer is configured to calculate one or more metrics. The back-end layer includes one or more processor units (here, Processor Unit 1 through Processor Unit M). Each back-end instance has one or more processor units, each with its own dedicated thread. Each of the processor units may include the components described with respect to Processor Unit M. A processor unit manages a set of tasks, all computed within its respective thread, to reduce context switching and synchronization, thereby reducing latency. As further described with respect to FIG. 4, a processor unit is configured to handle operational requests (such as adding/removing new streams or metrics); consume message events for the (active and replica) tasks it has assigned; forward the events to their appropriate task processors which handle event storage and task computation; and reply with the computation answer to a dedicated reply topic, for active tasks.

Each processor unit is simultaneously a consumer of event topics (inbound stream events), and a producer for reply messages (outbound aggregation results). A task encompasses the calculation of all metrics associated with a given (topic, partition) pair. A (topic, partition) enables the system to distribute work among nodes and processor units. As further described with respect to the messaging layer, events are routed, consumed, and processed according to their (topic, partition). Processor units have active tasks, for which they are the leaders, and replica tasks for which they are hot standbys. In various embodiments, to poll messages from the messaging layer, the processor unit has one or more consumers, for each type of task. For example, the processor unit has one consumer for the active tasks, and one or more consumers for the replica tasks. It is also possible for a processor to have only a consumer for active tasks and no consumers for replica tasks. Separating the consumers allows active tasks to be prioritized, and to better exploit a messaging system's rebalance protocol and consumer group guarantees.

In various embodiments, each processor unit is independent of other processor units, and two processor units deployed on the same physical node are logically equivalent to two nodes with one processor unit each. As such, by having many processor units inside a single node, multi-core machines can be efficiently used. Distributing processor units among multiple physical nodes has many advantages including better fault-tolerance, work rebalance, and high availability.

Processor Unit M includes one or more task processors (here, Task Processor 1 through Task Processor K). Each of the task processors may include the components described with respect to Task Processor 1. A task processor is configured to process message events and compute metrics for tasks. Each processor unit has as many task processors as (active or replica) tasks it has assigned. The tasks can be computed by several threads or can all be computed within a single thread. Thus, while the number of processor units sets the cluster's level of parallelism, the number of task processors in the cluster establishes the cluster's level of concurrency.

Figure 5:
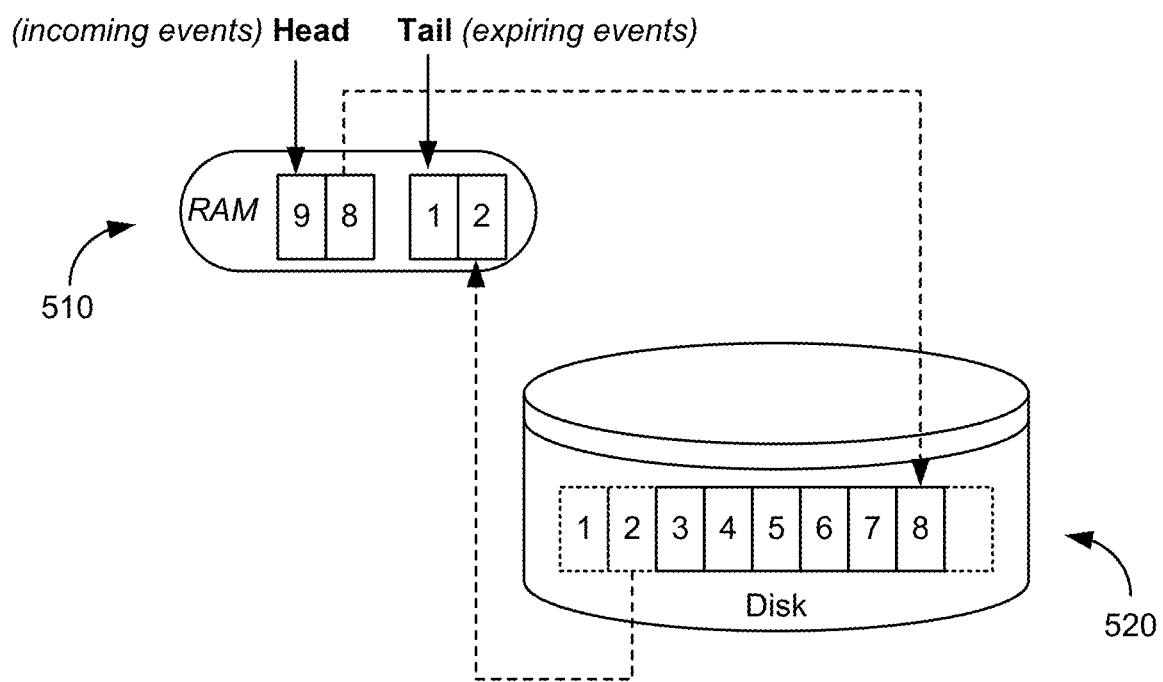
FIG. 5 is a diagram illustrating an example of an event reservoir included in a distributed streaming system supporting real-time sliding windows.

The event reservoir exploits time access patterns of events (which tend to be predictable) to optimize transfers between memory and stable storage, accessing (nearly all) events from memory using eager caching. Consequently, the disclosed system can deliver accurate results, per-event, with low latency. In various embodiments, each node has a locally-attached storage to minimize latency, a schema registry to support event schema evolution, and defines a data format and compression for efficient storage, both in terms of deserialization time and size. An example of an event reservoir is shown in FIG. 5.

The computation of all metrics for a given (topic, partition) encapsulates a task, which is performed by a task processor. In various embodiments, each task processor works independently of other task processors, without sharing information or needing to synchronize or access shared storage. To do so, each task processor includes: an event reservoir 312 that stores its own events, a metric state store 314 holding aggregation states of each configured metric, and an execution task plan. An example of a task plan is a directed acyclic graph (DAG) defining how metrics will be executed, further described with respect to FIG. 6.

The metric state store 314 is configured to store, for each metric key value, the latest aggregations results and auxiliary data. The metric state store may be implemented by a key-value store such as RocksDB, which is a reliable, memory efficient and low latency embedded key-value store, as further described with respect to FIG. 6.

The messaging layer is configured to communicate with a messaging system and handles distribution of tasks, detects failures, and manages communications between processor unit workers. To distribute work and achieve scalability, the disclosed system uses topic groupings 350 available in messaging systems such as Kafka®. In various embodiments, a stream is split into multiple topics by a partitioner (i.e., partitioner represents a split of a stream into groups). In various embodiments, the topics are further split into partitions, i.e., (topic, partition). Each stream can have multiple topics, depending on the combination of the metrics' groupbys, and each topic has multiple partitions which are distributed among the several nodes' processor units, as further described with respect to FIG. 8. A (topic, partition) maps to a task in the cluster, and is its minimal unit of work. Inside a task, aggregation metrics are calculated for a data stream subset, following a task plan optimized to reuse computations. In various embodiments, to support high-availability and fault-tolerance, tasks have multiple replicas, and a node processor unit concurrently handles a set of active tasks and a set of replica tasks. In various embodiments, the cluster relies on a message system's consumer group guarantees to ensure that tasks are always assigned to nodes, and provides a custom rebalance strategy further described herein to optimize task recovery, while safeguarding a balanced assignment from tasks to nodes.

In operation, when a new stream is registered by client 302, the front-end layer creates a set of partitioned topics to support it. The number of topics created per stream depends on the number of distinct group by fields of the stream. As further described herein, a stream is mapped to one or more topics to support work distribution across the several processing units. Hence, when a new event arrives (arrow 1), the front-end layer routes the event to all of its topics (arrow 2). In this example, the front-end layer simultaneously publishes any event of stream payments to Event Topic 1 (e.g., merchant) and Event Topic N (e.g., card), as there are group by aggregations for both merchant and card (Q1 and Q2 described above).

The back-end layer (more specifically, one or more back-end instances possibly residing in different nodes) is configured to calculate one or more metrics of a stream based on the event topics it has assigned (arrow 3). In some embodiments, the back-end layer replies to the node originally posting the event in its dedicated reply topic (arrow 4). Alternatively, the back-end layer replies to an original node directly without using reply node topics. The front-end layer is also configured to obtain (e.g., collect) one or more computations (arrow 5) from its reply topic, and respond to client 302 with the aggregations computed for that particular event in a single message (arrow 6).

Figure 4:
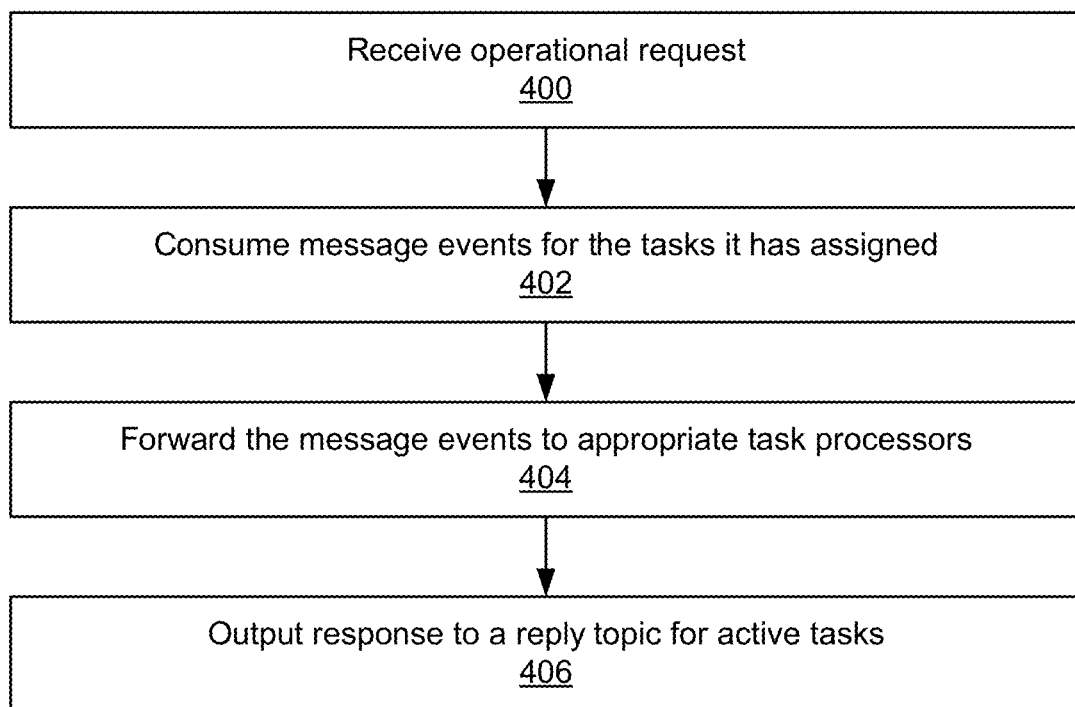
FIG. 4 is a flow diagram illustrating an embodiment of a process for processing requests in a distributed streaming system supporting real-time sliding windows.

FIG. 4 is a flow diagram illustrating an embodiment of a process for processing requests in a distributed streaming system supporting real-time sliding windows. In various embodiments, the process is performed by a processor unit such as Processor Unit 1 shown in FIG. 3.

In the example shown, the process begins by receiving an operational request (400). Operational requests may include adding/removing new streams or metrics.

The process consumes message events for the tasks it has assigned (402). In various embodiments, the process consumes message events for the active and replica tasks it has assigned. Active tasks and replica tasks is a categorization of a task based on a messaging system's consumer groups. In various embodiments, messages from a replica task are not expected to trigger a response from the processor since the responsibility belongs to active consumers. Alternatively, messages from a replica task do trigger a response.

The process forwards the message events to appropriate task processors (404). As described herein, the task processors are configured to handle event storage and task computation.

In various embodiments, partitioners are set prior to creating a stream. For example, the front-end layer receives, from configuration, the partitioners for a given a stream upon stream creation. Alternatively, partitioners can also be set after a stream is created, which causes the creation of new (topic, partition). The cluster may then be rebalanced as further described herein. In various embodiments, a sticky rebalancing strategy is used, meaning task assignments are preserved to their previous processor as much as possible. As a result, the processing performance of the existing (topic, partition) of the cluster is generally unaffected when a rebalance is triggered for adding new topics compared with techniques that do not include rebalancing. In various embodiments, adding a new partitioner is done only when a new top-level group by is needed which, in practice, is rarely required after a stream is created.

A partition is a concept from distributed systems that is also used by messaging systems such as Kafka® to enable work to be distributed among several consumers (e.g., processor units). Using the example of Kafka®, producers are allowed to provide a key when publishing a message, which is hashed according to the number of partitions defined for a topic. When a key is provided, it is guaranteed that messages with the same key will always be delivered to the same (topic, partition). In various embodiments, the disclosed system configures the message key for each topic to be the partitioner. When a new event arrives for a stream, the front-end layer node receiving the event publishes as many messages as partitioners defined for that stream.

The number of partitions for each topic is defined according to the expected load of each stream-partitioner. Given that the (topic, partition) is the minimal work unit, the distinct number of (topic, partition) establishes the number of task processors created in the disclosed system, where each task processor handles a single pair of (topic, partition). Hence, by increasing the number of partitions, the cluster's level of concurrency can be increased. By exploiting the messaging system's guarantees over consumer groups, exactly one active task processor for each existing (topic, partition) is ensured. In various embodiments, to support high-availability, the number of task processors is multiplied by a replication factor. Thus, if there are n distinct (topic, partition), and r is the replication factor, there are n×r task processors working in the cluster.

The process outputs a response to a reply topic for active tasks (406). In other words, the process replies with the computation answer to a dedicated reply topic for active tasks without outputting responses to replica tasks.

FIG. 5 is a diagram illustrating an example of an event reservoir included in a distributed streaming system supporting real-time sliding windows. This event reservoir is an example of the event reservoir 312 of FIG. 3.

The event reservoir is configured to store events associated with (e.g., being/to be processed by) a task processor, and allows efficient access of the events as they are needed by windows to update the aggregations. As shown, the event reservoir includes two parts: a first part 510 holding the tail (expiring events) and head (incoming events) of each window, and a second part 520 holding the full set of events. In other words, the second part stores all events (which could be part of different windows) for which a specific task processor is responsible. In various embodiments, the first part is volatile memory (e.g., RAM and tends to be very small) and the second part is in persistent storage (e.g., disk).

Processing an event starts with the event reservoir, where events are persisted to and loaded from disk as needed. Before persistence, events are serialized and compressed into groups of contiguous chunks in RAM. Grouping events into chunks helps to reduce the number of I/O operations needed. In various embodiments, in a reservoir, all I/O operations are asynchronous so as to not affect event processing latency. Chunks hold multiple events and are kept in-memory until they reach a fixed size, after which they are closed, serialized, compressed, and persisted to disk over ordered and append-only files. Similarly, files hold multiple chunks of events, until they reach a fixed size, after which they become immutable. Since files are immutable and events follow a monotonic order given by their timestamp, random reads are efficiently supported by maintaining an auxiliary index in-memory, from timestamps to files. Supporting random reads may be especially useful when adding new windows to the system. Since chunks are (frequently) persisted to disk, recovery is simplified, as only the most recent events can be lost, and quickly recovered from messaging system broker nodes.

Out-of-order events are supported until the closure of a chunk, in other words, as long as the event timestamp occurs after the most recently closed chunk timestamp. After that moment, and depending on the configuration, events are either discarded, or have their timestamp rewritten to the first timestamp of the chunk. For scenarios requiring extensive support for out-of-orders events, the chunk closure can be delayed by a time period provided by configuration. This keeps chunks in a transition state in-memory for a threshold period, on which they are closed for recent events, but are still open for late events. This configuration can be seen as a watermark. In various embodiments, to meet latency requirements, while the closure of a chunk may be delayed, the answer and computation of event metrics is not delayed, as opposed to systems such as Spark Streaming or Flink. In various embodiments, events are also de-duplicated based on an ID, against the chunks still in-memory, to avoid processing an event more than once.

The reservoir takes advantage of a predictable event consumption pattern in stream processing where events are always consumed by their timestamp order, by advancing windows. Namely, the reservoir provides very efficient iterators which transparently load chunks of events into memory as they are needed by windows. Iterators eagerly load adjacent chunks into cache when a new chunk is loaded from disk, and starts to be iterated. Hence, when a window needs events from the next chunk, the chunk is normally already available for iteration. Notwithstanding, if for some reason, chunks are evicted from the application cache before they are requested, thus resulting in a system call to fetch them from disk, the request will likely not trigger an actual read request to disk. Since chunks are organized as a sequence in a file, the operating system I/O will likely already read ahead the chunk contents into page cache. Thus, when a chunk is not in cache when it is requested, it is likely delivered from the OS page cache, paying only the deserialization cost, which is a fraction of what it would be if an actual I/O request to disk was required. This predictability helps relax the hardware demands for the reservoir tremendously, as even for low latency scenarios, a network-attached storage or HDDs can be used, instead of holding all events in memory, which significantly reduces the total cost of ownership.

In this example, chunk 9 is an open chunk being iterated by the Head, chunk 8 is a closed chunk ready to stored, chunk 2 is a closed chunk in cache, ready to be iterated to next, chunk 1 is a closed chunk being iterated by the Tail, and chunks 3-8 are closed chunks in disk.

Along with a reservoir, a Schema Registry is retained to support schema evolution of events. Before they are persisted, chunks are serialized using a specific event's schema and stored referencing their current schema ID. Each time the event schema changes, a new entry is added to the schema registry, and the current schema ID reference is updated. This allows metrics to be computed over events that have different schema versions. Whenever a chunk is to be deserialized with an old schema, that schema is retrieved from the schema registry. Chunks are also compressed aggressively to guarantee a good compression ratio. This minimizes storage overhead, since events can be replicated across multiple task processors.

Regardless of the window type and window size, only a tiny fraction of events need to be kept in-memory, as shown in FIG. 5. In this example, by default, each window has two iterators: one for the head of the window (incoming events), and another for the tail (expiring events). Each iterator only needs one chunk in-memory. Whenever possible, iterators are re-used among windows. For instance, over the same reservoir, two real-time sliding windows always share the same head iterator (e.g., a 1-min and a 5-min sliding window share the same head iterator, which points to the most recently arrived event). This design makes the reservoir optimal for I/O, and extremely efficient for long windows. Namely, and except for the extra storage needed (minimized by compression and serialization), windows of years are equivalent to windows of seconds in performance, accuracy, and memory consumption.

Figure 6:
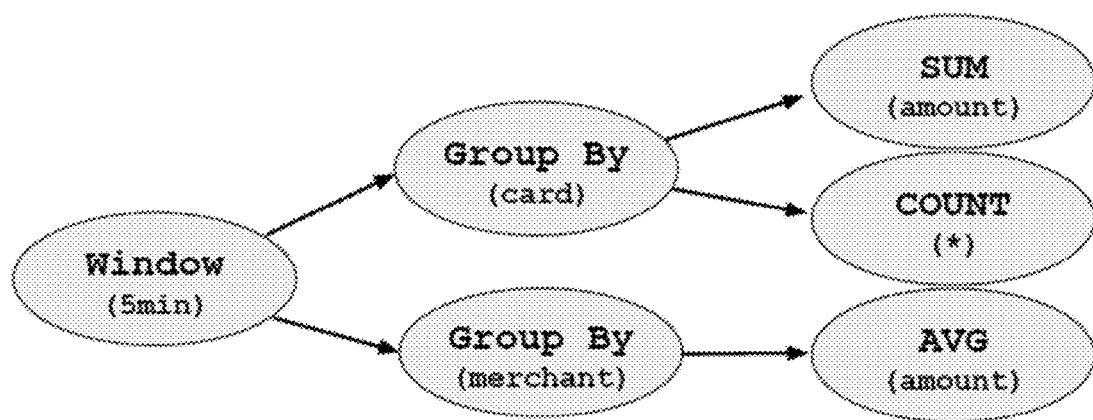
FIG. 6 is a diagram illustrating an example of a task plan included in a distributed streaming system supporting real-time sliding windows.

FIG. 6 is a diagram illustrating an example of a task plan included in a distributed streaming system supporting real-time sliding windows. The task plan can be stored in or otherwise accessible by a task processor.

In various embodiments, the task plan is a DAG of operations that compute all the metrics of a task, following the order: Window, Filter, Group By, Aggregator. Since metrics may often share the same Window, Filter, and Group By operators, the plan optimizes these by reusing the DAG's prefix path.

The DAG shown here corresponds to Example 1. In it, all metrics share the same window, but Q1 groups by field card while Q2 by field merchant. Optimizing the DAG to reuse operators prevents repeating unnecessary computations, especially ones related with windows. Every time a plan advances time, the Window operator produces the events that arrive and expire, to the downstream operators of the DAG. However, to make these optimizations, the system's query expressibility can be restricted to follow a strict order of operations as further described herein.

While the roots of the DAG iterate over the reservoir and push events downstream, the leaves (e.g., Aggregator operators) use the state store to keep and access the results of the aggregations.

The amount of keys in the metric state store (e.g., 314), and their access pattern is tightly related with the task plan. In various embodiments, each key represents a particular metric entity in a plan, and the amount of keys accessed per event matches the number of leaves in the DAG. For instance, for each event, the plan of FIG. 6 will access two keys for the card aggregations (sum and count), and one key for the merchant (amount). Each key holds the aggregation current value for the specific metric and entity. Depending on the aggregation type, auxiliary data may be stored with the aggregation. For instance, an average causes a counter to be stored, to update the value correctly when a new event arrives or expires. On the other hand, a sum or a count, does not store any additional data.

To support fault-tolerance, the key-value store (e.g., RocksDB) provides checkpointing, which forces the flushing of all data in-memory to disk. However, by design, even without checkpoints, data is only kept in-memory for a short period of time, and is frequently persisted to disk. This makes checkpoints very efficient, since only a small amount of data needs to be written to disk, at a given time. Checkpoint triggers are synchronized between the event reservoir and the state store, and references to the latest event checkpoint offset of each task processor and node are (frequently stored) in a dedicated messaging system topic, which ensure that both stores can be easily recovered during a failure.

Figure 7:
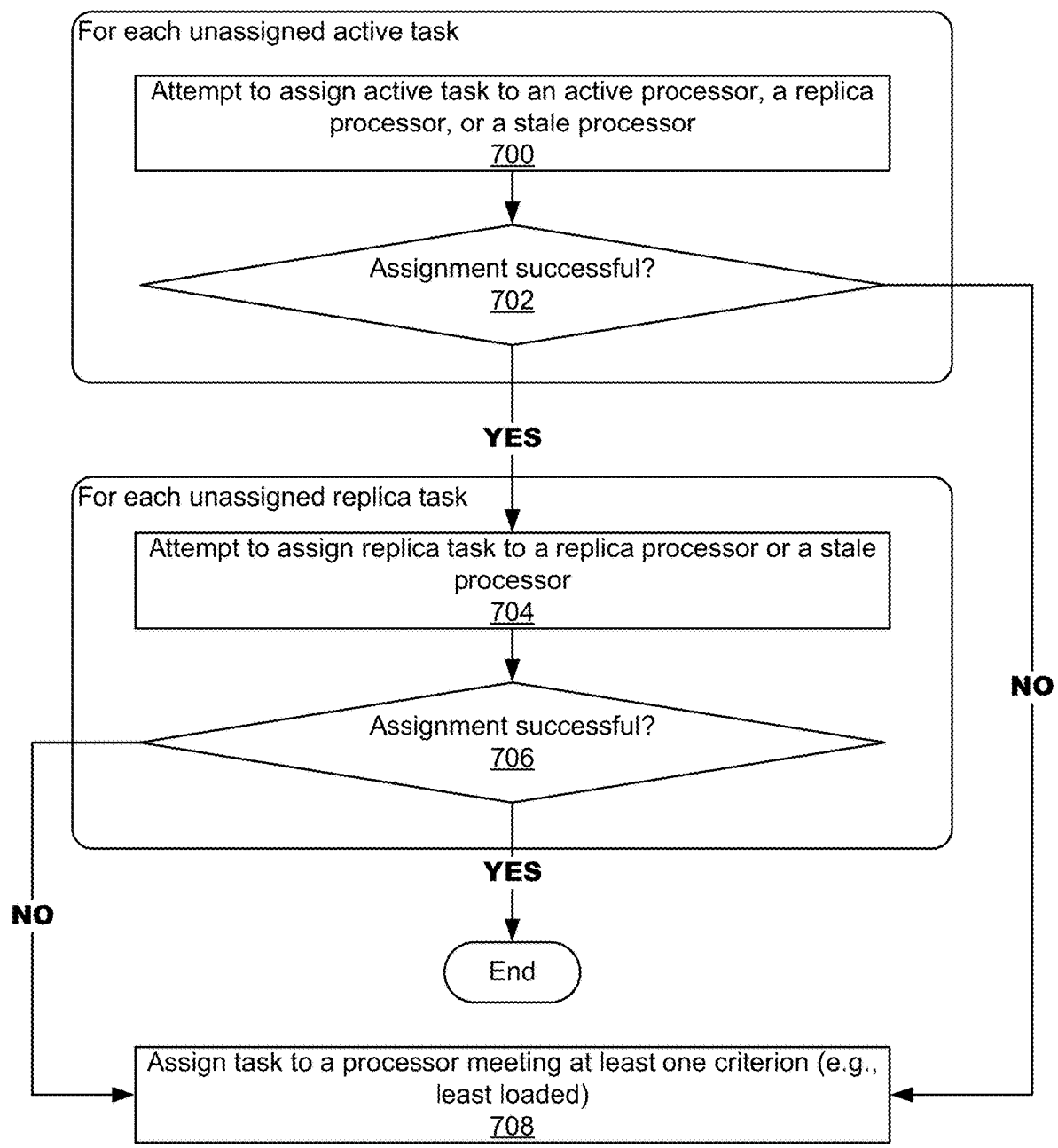
FIG. 7 is a flow diagram illustrating an embodiment of a process for rebalancing in a distributed streaming system supporting real-time sliding windows.

FIG. 7 is a flow diagram illustrating an embodiment of a process for rebalancing in a distributed streaming system supporting real-time sliding windows. In various embodiments, this rebalancing process is performed by a node such as Node N shown in FIG. 3. In this example, the assignment strategy logic is split into two main assignments: active tasks and replica tasks.

The assignment of tasks to nodes and processor units is triggered during a messaging system rebalance. In various embodiments, a rebalance is performed when nodes or tasks are added/removed from the cluster.

A messaging system such as Kafka® tracks consumers within each consumer group to guarantee load distribution and message delivery. One type of consumer group protocol ensures each (topic, partition) has exactly one consumer assigned in a group. In particular, it is impossible to have a (topic, partition) assigned to multiple consumers of the same group, and if there are more consumers in a group than (topic, partition) combinations, a consumer might not have any (topic, partition) assigned. A messaging system may achieve this by continually tracking what consumers are registered for a consumer group, and actively receiving heartbeats for each consumer. When a consumer enters or leaves a consumer group (either due to a failure or graceful shutdown), a rebalance is performed.

When a rebalance is triggered, one of the system nodes shown in FIG. 3 (the consumer group coordinator) decides how (topic, partition) pairs are distributed among each consumer. In various embodiments, the disclosed system uses a custom assignment strategy. Alternatively or in combination with the custom assignment strategy, a messaging system's default/options for assigning (topic, partition) to consumers may be used.

As described herein, a task maps to a specific (topic, partition), and consumers (located within processor units) can have tasks assigned as active and as replicas. In various embodiments, a processor unit is configured to process messages from both active and replicas, and compute their aggregations in the same way. The only difference is that messages from replica tasks will not trigger a response from the processor. While active consumers share the same consumer group, replica consumers have different consumer groups from active and other replica consumers. This allows a (topic, partition) to be assigned to a single active consumer in the cluster, but also to multiple replica consumers, simultaneously. Since both active and replica tasks consume messages from the same (topic, partition), they always consume them in the same order, ensuring consistency on the reservoir and metric state store for the several replicas.

In various embodiments, the process shown here (an assignment strategy logic) implements a greedy approach that protects two invariants: 1) tasks are only assigned to a physical node once; 2) the load of each processor respects a predefined budget it has available.

The first invariant may help to prevent the loss of multiple task copies when a node fails, or it is decommissioned. Hence, while metric computation within each task processor is agnostic to where processor units are located, the assignment strategy is not. Consequently, the strategy takes as input the locality of each processor, to ensure that a physical node will never be assigned the same task twice during the same a rebalance iteration assignment.

The second invariant relates with how load is distributed among the several consumers. To ensure that load is fairly distributed among the cluster, for each assignment, the strategy sets the maximum budget of each processor unit as: budget=tasks. Each time a rebalance is triggered, the available budget of a node is reset to this value. Whenever a task is assigned to a processor, the available budget of a node is decremented by 1. When its budget reaches 0, the processor no longer receives assignments. In various embodiments, all tasks are considered as equal. In other embodiments, tasks may be assigned a different weight, depending on their computational cost (i.e., partition load, event reservoir size, etc.).

To ensure these two invariants, upon each new rebalance iteration assignment, the group coordinator collects cluster metadata to understand how many tasks, physical nodes and processor units exist, and how processors are located within each physical node.

The process begins by attempting to assign an active task to an active processor, replica processor, or stale processor (700). In various embodiments, the process first attempts to assign an active task to an active processor. That is, active tasks can be prioritized by allocating active tasks prior to activating replica tasks. Regardless of the task's type (active or replica), the goal of the sticky assignment strategy is to avoid data reshuffling as much as possible, while respecting the two invariants above. Therefore, the process tries to maintain the task in the consumer that had the task in the previous iteration. An assignment might fail, if one of the two invariants fails.

If the attempt to assign to an active processor fails, then the process attempts to assign an active task to a replica processor. In other words, active tasks that cannot be kept in the same processor will be assigned to a processor previously holding one of its previous replica tasks, if possible. If more than one processor replica is available for assignment, the process selects the one with the least load. An assignment might fail, if one of the two invariants fails.

If the attempt to assign to a replica processor fails, then the process attempts to assign an active task to a stale processor. A stale task is a task for which the processor used to be assigned in the past (either as active or replica), but lost its assignment during a rebalance. In other words, processors with stale tasks are processors that still have data "leftovers" available for that task. Hence, assigning a task to one of its stale processors, only involves recovering a subset of the data, instead of the whole data. In various embodiments, in case of ties, the process selects the processor with the least load. In various embodiments, the processor may prioritize stale processors to which the task is assigned based on how much data is available because assigning to a processor with more available data involves less data shuffle.

If the assignment is not successful (702), the process proceeds to assign the task to a processor meeting at least one criterion (708). If none of the assignments is possible, the task is assigned to the consumer meeting some criteria such as having the most available budget, involving the least data shuffle, being best suited for characteristics of the task, etc. 700 and 702 can be repeated for each unassigned active task.

After processing the active tasks, the process proceeds to attempt to assign a replica task to an active processor, replica processor, or stale processor (704). 704 and 706 are like their counterparts 700 and 702, with the difference being the task is a replica task rather than an active task and there is no attempt to assign the replica task to an active processor.

This assignment strategy, in combination with a replication factor, allows a system to achieve high-availability. When a node fails and a rebalance is triggered, active tasks are the first tasks assigned, maximizing the probability to be allocated in nodes already holding that task. In this case, the processor does not need to recover any data and the task is recovered immediately.

When a task is assigned to a processor that was not actively processing it before (either as active or replica), a recovery process happens within that processor, which might affect these tasks' immediate availability. However, since the assignment of active tasks is prioritized over replicas, this is unlikely to happen for active tasks. As usual, the replication factor is set according to the number of failures that is tolerable (e.g., based on user preference) before affecting a task's availability. For example, the replication factor can be three.

To perform recovery, the processor triggers a request to another processor unit that still has data available. The request may include copying the event reservoir, the state store, and the last event offset since its last checkpoint. After data is transferred, the processor starts its execution by consuming messages from the messaging system since the last checkpointed offset. One advantage of this approach is that a processor with stale data only needs to copy the delta between its own last checkpoint and the newest checkpoint available in the cluster, thereby minimizing the time to recover.

The disclosed system supports SQL-like query statements, where each statement can include multiple aggregations over a single stream. In various embodiments, the disclosed system is configured with a proprietary language. Currently, Railgun does not natively support stream joins. In practice, we implement joins (e.g., between a stream and a lookup table) prior to the streaming engine, in an enrichment stage.

As described herein, unlike conventional systems, the disclosed system supports infinite windows, i.e., windows where events never expire (e.g., the count of all distinct addresses of a client). Any window can be delayed, i.e., where instead of considering the window against the latest arriving event, we can delay its starting by a specific delay offset. Delayed windows are especially useful in bot-attacks scenarios when the window aggregations are used as reference that as they are delayed, they are not affected by recent bot attack changes. The disclosed system can also be configured to support one or more of the following types of windows: sliding, hopping, and tumbling.

In various embodiments, the system uses jexel expressions as a filter expression language to support additional flexibility, using Java. Some example operators for the disclosed system are:

```
SELECT AggExpression FROM streamName
WHERE filterExpression
GROUP BY fields
OVER WindowExprESSION
AggExpression      ::=   Aggregation(field)          |
                        Aggregation(field),   AggExpression
Aggregation        ::=   count                       |
                        sum                         |
                        avg                         |
                        stdDev                      |
                        max                         |
                        min                         |
                        last                        |
                        prev                        |
                        countDistinct               |
WindowExpression   ::=   TimeWindowExpr              |
                        TimeWindowExpr delayed by offset
TimeWindowExpr     ::=   sliding windowSize          |
                        tumbling windowSize         |
                        infinite
```

Figure 8:
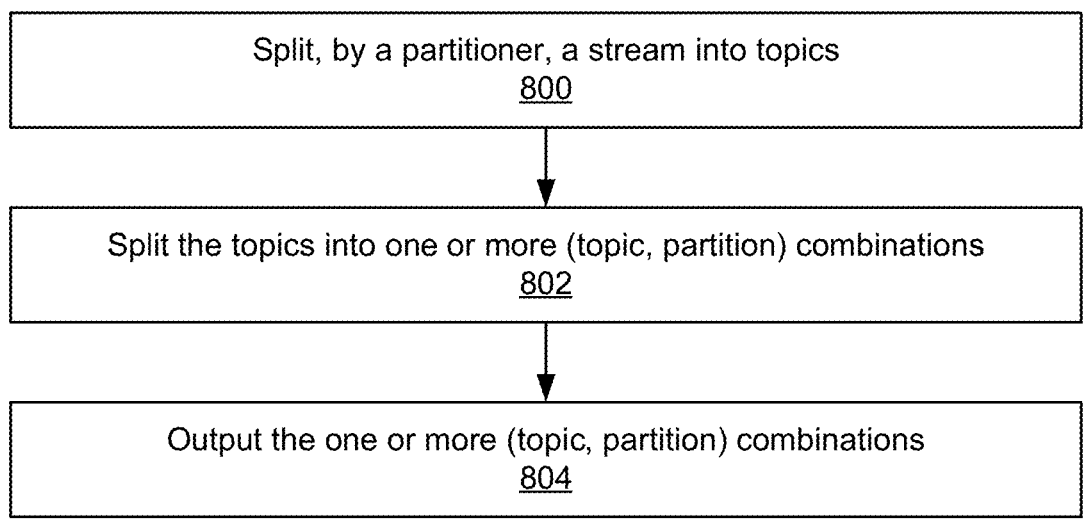
FIG. 8 is a flow diagram illustrating an embodiment of a process for routing events into topic groupings.

FIG. 8 is a flow diagram illustrating an embodiment of a process for routing events into topic groupings. In various embodiments, the process is performed by a system such as the one shown in FIG. 3.

The process begins by splitting, by a partitioner, a stream into topics (800). Each data stream has a topic for each configured top-level entity, called "partitioner" or "topic grouping". Referring briefly to FIG. 3, two topics are shown for two partitioners—Event Topic 1 (e.g., merchant) and Event Topic 2 (e.g., card)—over the same payments stream. In various embodiments, the set of partitioners is manually provided by an administrator when a stream is created, depending on the possible group-bys of the metrics. Alternatively or in addition, partitioners can be programmatically/automatically determined by a computer processor, machine learning model, or the like. Managing topics helps to ensure that whenever a task processor is computing a metric for an entity (e.g., of a particular card, or merchant), it receives all that entity's events. Since computation is contained within a task processor, this is necessary to provide accurate metrics. An event may be forwarded to one or more topics. For example, metrics with multiple group-bys over a stream, as in Q1 and Q2 of Example 1, causes the event to be forwarded to more than one topic (arrow 2 of FIG. 3). In various embodiments, events are replicated as many times as the number of partitioners (i.e., top-level entities such as card or merchant) needed for a stream, resulting in a few topics per stream.

The number of topics needed is usually small, and it is not necessarily equal to the number of distinct group-by keys of all stream metrics defined (which could lead to dozens of topics). Events hashed by a subset of their group by keys (e.g., two metrics, with one metric grouping by card and merchant, and the other metric grouping by card, could both use topic card) are sufficient to provide accurate metrics. This reduces storage required of the messaging system.

The process splits the topics into one or more (topic, partition) combinations (802). A (topic, partition) combination enables work to be distributed among the several nodes and processor units in an efficient manner.

The process outputs the one or more (topic, partition) combinations (804). As described herein, a (topic, partition) represents a unit of work that can be assigned to a task processor such as the ones shown in FIG. 3. In various embodiments, each task processor is responsible for computing a respective (topic, partition). By splitting a stream into multiple topics (800), then dividing into multiple (topic, partition) combinations, different aspects of events in the stream can be analyzed. For instance, an event may concern payments and get associated with a first Event Topic, "Merchant", and separately with a second Event Topic, "Card". These then get split into separate (topic, partitions) so that they are analyzed with respect to Merchants and, separately, with respect to Cards.

Figure 9:
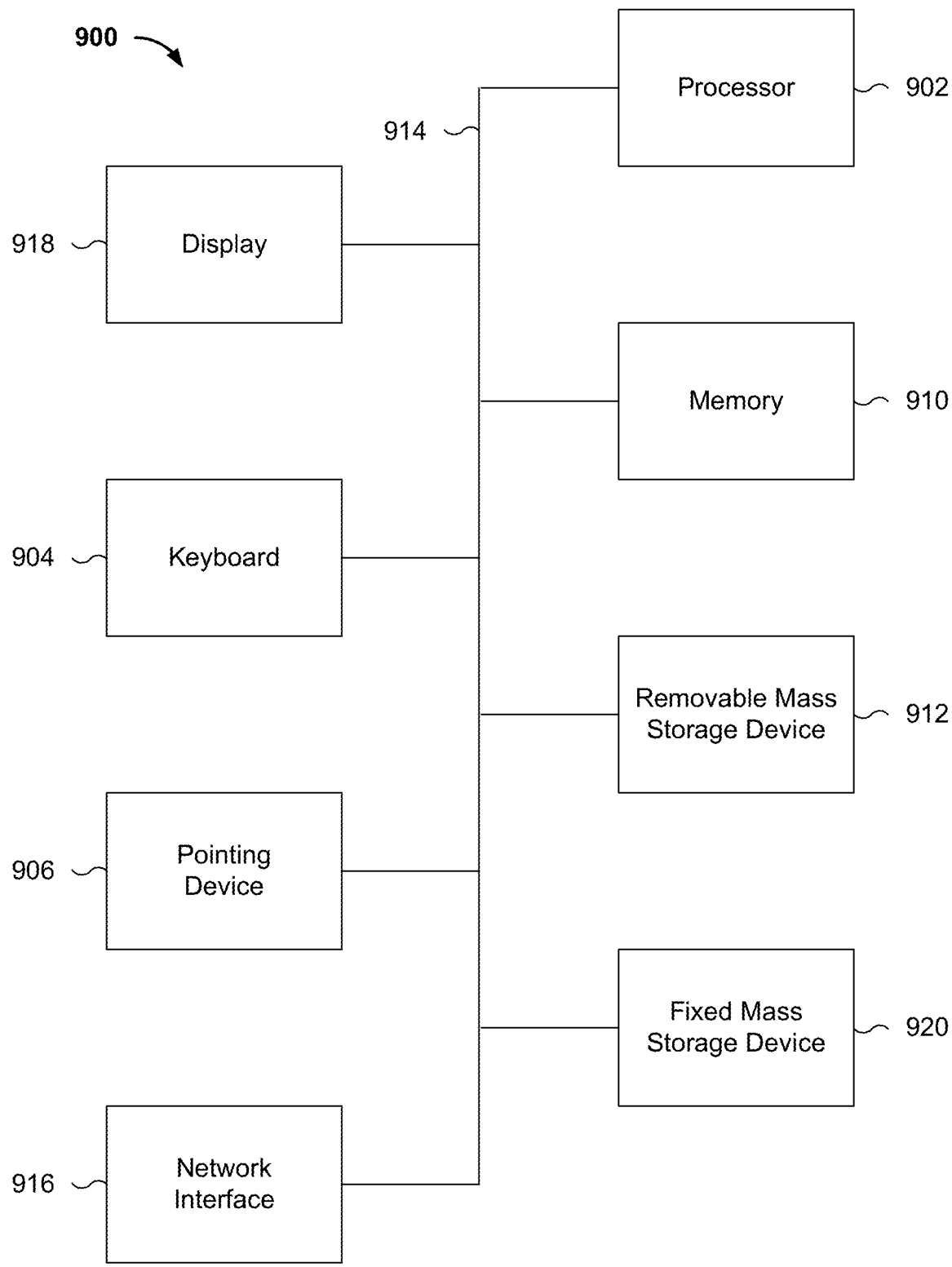
FIG. 9 is a functional diagram illustrating a programmed computer system for supporting real-time sliding windows can be implemented in accordance with some embodiments.

FIG. 9 is a functional diagram illustrating a programmed computer system for supporting real-time sliding windows can be implemented in accordance with some embodiments. As will be apparent, other computer system architectures and configurations can be used to perform the described techniques. Computer system 900, which includes various subsystems as described below, includes at least one microprocessor subsystem (also referred to as a processor or a central processing unit (CPU) 902. For example, processor 902 can be implemented by a single-chip processor or by multiple processors. In some embodiments, processor 902 is a general purpose digital processor that controls the operation of the computer system 900. In some embodiments, processor 902 also includes one or more coprocessors or special purpose processors (e.g., a graphics processor, a network processor, etc.). Using instructions retrieved from memory 910, processor 902 controls the reception and manipulation of input data received on an input device (e.g., pointing device 906, I/O device interface 904), and the output and display of data on output devices (e.g., display 918).

Processor 902 is coupled bi-directionally with memory 910, which can include, for example, one or more random access memories (RAM) and/or one or more read-only memories (ROM). As is well known in the art, memory 910 can be used as a general storage area, a temporary (e.g., scratch pad) memory, and/or a cache memory. Memory 910 can also be used to store input data and processed data, as well as to store programming instructions and data, in the form of data objects and text objects, in addition to other data and instructions for processes operating on processor 902. Also as is well known in the art, memory 910 typically includes basic operating instructions, program code, data, and objects used by the processor 902 to perform its functions (e.g., programmed instructions). For example, memory 910 can include any suitable computer readable storage media described below, depending on whether, for example, data access needs to be bi-directional or uni-directional. For example, processor 902 can also directly and very rapidly retrieve and store frequently needed data in a cache memory included in memory 910.

A removable mass storage device 912 provides additional data storage capacity for the computer system 900, and is optionally coupled either bi-directionally (read/write) or uni-directionally (read only) to processor 902. A fixed mass storage 920 can also, for example, provide additional data storage capacity. For example, storage devices 912 and/or 920 can include computer readable media such as magnetic tape, flash memory, PC-CARDS, portable mass storage devices such as hard drives (e.g., magnetic, optical, or solid state drives), holographic storage devices, and other storage devices. Mass storages 912 and/or 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can be used to provide access to other subsystems and devices as well. As shown, these can include a display 918, a network interface 916, an input/output (I/O) device interface 904, a pointing device 906, as well as other subsystems and devices. For example, image processing device 906 can include a camera, a scanner, etc.; I/O device interface 904 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 900. Multiple I/O device interfaces can be used in conjunction with computer system 900. The I/O device interface can include general and customized interfaces that allow the processor 902 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 916 allows processor 902 to be coupled to another computer, computer network, or telecommunications network using a network connection as shown. For example, through the network interface 916, the processor 902 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 9 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 904 and display 918 share the touch sensitive screen component, which both detects user inputs and displays outputs to the user). In addition, bus 914 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a stream of events at a plurality of distributed nodes;
routing the events into topic groupings;
using one or more events in at least one of the topic groupings to determine one or more metrics of events with at least one window and an event reservoir including by:
tracking, in a volatile memory of the event reservoir, beginning and ending events within the at least one window; and
tracking, in a persistent storage of the event reservoir, events associated with tasks assigned to a respective node of the plurality of distributed nodes; and
updating the one or more metrics based on one or more previous values of the one or more metrics as a new event is added or an existing event is expired from the at least one window.

2. The method of claim 1, further comprising:
sliding the at least one window as the new event is added or the existing event is expired, wherein the at least one window includes a real-time sliding window.

3. The method of claim 1, wherein using the one or more events in at least one of the topic groupings to determine the one or more metrics of events with the at least one window includes updating an execution task plan.

4. The method of claim 1, wherein using the one or more events in at least one of the topic groupings to determine the one or more metrics of events with the at least one window includes distributing tasks to the plurality of distributed nodes such that computation of tasks is scalable by adding nodes.

5. The method of claim 1, further comprising:
assigning a task to a node of the plurality of distributed nodes,
meeting a load budget of each node of the plurality of distributed nodes, or
replicating at least a portion of the tasks to nodes in the plurality of distributed nodes.

6. The method of claim 1, further comprising, using an execution task plan to, for at least one active task in a set of active tasks:
attempt to assign an active task to an active processor; and
in response to a determination that the attempt to assign the active task to the active processor has failed, attempt to assign the active task to a replica processor.

7. The method of claim 6, further comprising, after assigning the active task, using an execution task plan to, for at least one replica task in a set of replica tasks:
attempt to assign a replica task to a replica processor;
in response to a determination that the attempt to assign the replica task to the replica processor has failed, attempt to assign the active task to a stale processor; and in response to a determination that the attempt to assign the active task to the stale processor has failed, assign the active task a processor meeting at least one criterion.

8. The method of claim 7, wherein the assignment of the active task and the assignment of the replica task are performed during a recovery operation.

9. The method of claim 1, wherein the at least one window includes at least one of: a real-time sliding window, a delayed window, an infinite window, or a tumbling window.

10. The method of claim 1, further comprising determining a task encapsulating calculation of all metrics associated with a specified partition.

11. The method of claim 10, wherein the specified partition is a unit of computation such that events are processed according to their respective partitions.

12. The method of claim 10, wherein the task is at least one of: an active task assigned to a node of the plurality of nodes or a replica task for which the node is a backup processor.

13. The method of claim 1, wherein a replication factor associated with how many replica tasks to create is based on a threshold of tolerable failures.

14. The method of claim 1, wherein:
events of the stream of events are organized into chunks including member events ordered by timestamp; and
at least one adjacent chunk is eagerly loaded in response to the loading of one of the chunks into a volatile memory.

15. The method of claim 1, wherein the event reservoir includes a schema registry describing fields associated with events and the schema registry is updated in response to schema changes within the stream of events.

16. The method of claim 1, wherein:
a metric state store is organized as a key-value store;
a key in the key-value store represents a metric entity in a task plan; and
a number of keys accessed per event matches a number of roots in the task plan.

17. The method of claim 16, further comprising providing checkpointing, wherein checkpoint triggers are synchronized between the event reservoir and the metric state store.

18. The method of claim 1, wherein routing the events into the topic groupings includes replicating a given event as many times as a number of partitioners for the stream.

19. A system, comprising:
an event reservoir including a volatile memory and a persistent storage;
one or more processors included in a plurality of distributed nodes, at least a portion of is the one or more processors configured to:
receive a stream of events;
route the events into topic groupings;
use one or more events in at least one of the topic groupings to determine one or more metrics of events with at least one window and an event reservoir including by:
tracking, in the volatile memory of the event reservoir, beginning and ending events within the at least one window; and
tracking, in the persistent storage of the event reservoir, events associated with assigned tasks; and
update the one or more metrics based on one or more previous values of the one or more metrics as a new event is added or an existing event is expired from the at least one window.

20. A computer program product embodied in a non-transitory computer readable medium and comprising computer instructions for:
receiving a stream of events at a plurality of distributed nodes;
routing the events into topic groupings;
using one or more events in at least one of the topic groupings to determine one or more metrics of events with at least one window and an event reservoir including by:
tracking in a volatile memory of the event reservoir, beginning and ending events within the at least one window; and
tracking, in a persistent storage of the event reservoir, events associated with tasks of a respective node of the plurality of distributed nodes; and
updating the one or more metrics based on one or more previous values of the one or to more metrics as a new event is added or an existing event is expired from the at least one window.

* * * * *

UNITED STATES PATENT AND TRADEMARK OFFICE
CERTIFICATE OF CORRECTION

| | | |
|---|---|---|
| PATENT NO. | : 11,645,114 B2 | Page 1 of 1 |
| APPLICATION NO. | : 17/575477 | |
| DATED | : May 9, 2023 | |
| INVENTOR(S) | : João Miguel Forte Oliveirinha et al. | |

It is certified that error appears in the above-identified patent and that said Letters Patent is hereby corrected as shown below:

On the Title Page

Item (73), assignee, residence, after "Feedzai - Consultadoria e Inovação Tecnológica, S.A.", insert --, (PT)--, therefor.

In the Claims

In Column 20, Line 42, Claim 20, delete "one or to more" and insert --one or more--, therefor.

Signed and Sealed this
Twenty-fourth Day of October, 2023

*Katherine Kelly Vidal*

Katherine Kelly Vidal
*Director of the United States Patent and Trademark Office*